UNITED STATES PATENT OFFICE.

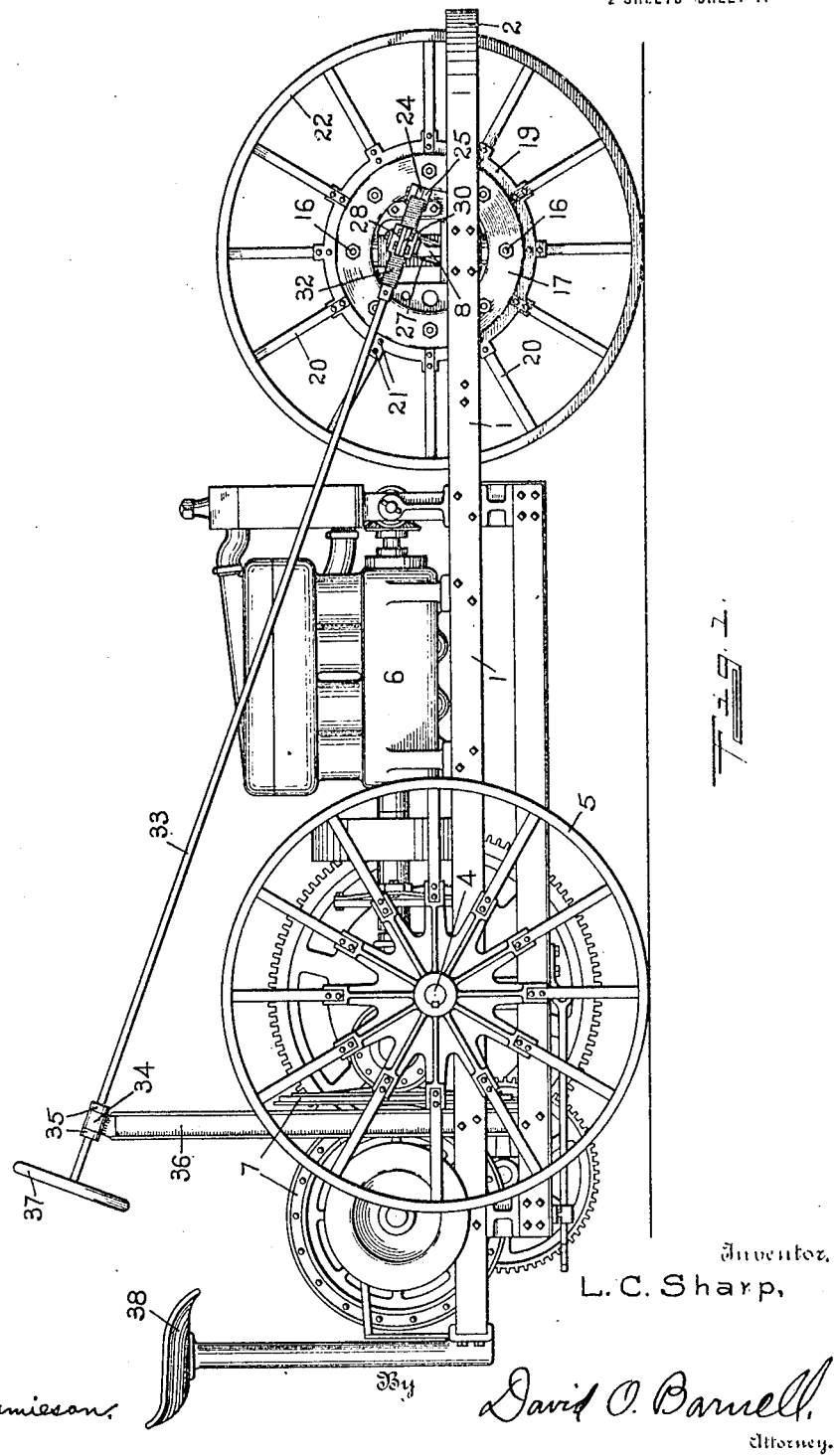

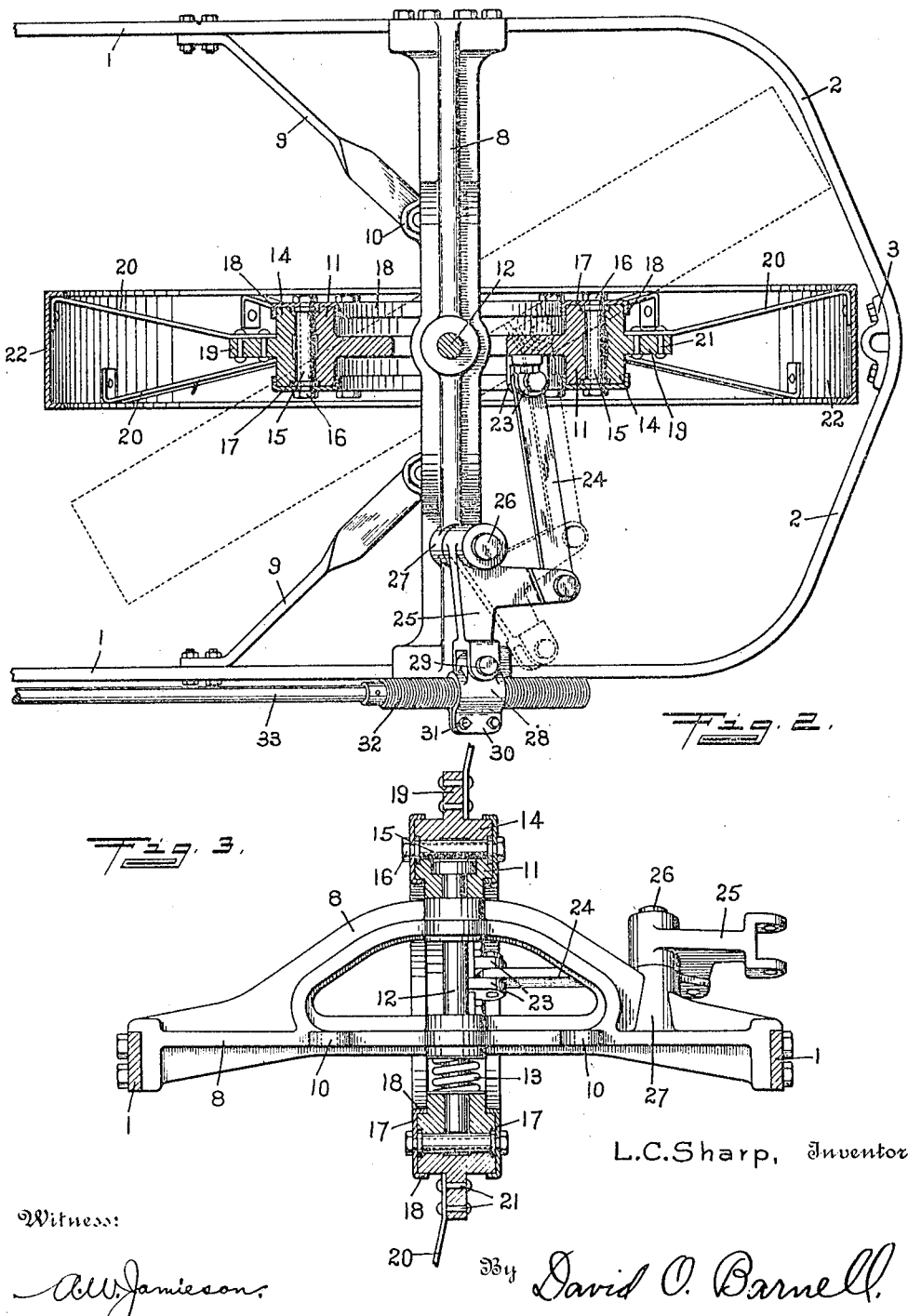

LEE C. SHARP, OF PLATTSMOUTH, NEBRASKA.

TRACTOR STEERING-GEAR AND FRAME.

1,286,126.  Specification of Letters Patent.  Patented Nov. 26, 1918.

Application filed July 27, 1916. Serial No. 111,640.

*To all whom it may concern:*

Be it known that I, LEE C. SHARP, a citizen of the United States, and a resident of Plattsmouth, in the county of Cass and State of Nebraska, have invented certain new and useful Improvements in Tractor Steering-Gears and Frames, of which the following is a specification.

My invention relates to the general class of self-propelled vehicles, and especially to machines of the class commonly known as tractors, and adapted for pulling other vehicles, such as agricultural machines and the like. It is the object of my invention to provide in a machine of this class a strong and simple frame in combination with driving and steering wheels of equal size arranged so that the frame extends horizontally below the axes of the wheels. A further object of my invention is to provide for such a machine simple and efficient steering mechanism, including a single steering-wheel of large diameter, mounted with reference to the frame so as to avoid the production of torsional stresses therein in turning, and to avoid inclining the plane of rotation of the wheel to the surface of the ground. These objects are attained mainly by a peculiar special construction and mounting of the steering-wheel, whereby the same is turned about a vertical axis and constantly encircles a fixed rigid axle-member of which both ends are rigidly attached and braced to the longitudinal members of the frame.

In the accompanying drawings Figure 1 is a side elevation of a machine embodying my invention, Fig. 2 is a partial plan of the frame, the steering-wheel being shown in horizontal axial section, and Fig. 3 is a transverse vertical section, giving a rear view of the fixed axle and showing the central part of the steering-wheel in vertical section.

In the illustrated embodiment of my invention the main frame is horizontal and has parallel side-bars 1 of which the front ends curve inwardly and extend angularly toward each other to form an integral transverse connecting portion 2, as shown in Fig. 2. At the center of the portion 2 there is secured on the inner side thereof a U-strap 3 forming an eye for convenience in coupling the machine with another positioned in front thereof. Intermediate the central and rearward parts of the frame, the rear axle 4 extends transversely through suitable bearings secured on the main frame above the side-bars 1, and on the ends of said axle outside the frame are the driving-wheels 5 which support the rear portion of the machine. An engine 6 is mounted on the central part of the frame, and the engine and driving wheels are operatively connected by suitable transmission gearing, preferably including speed-changing friction-wheels 7. The details of structure, and means for controlling the power-transmission gearing, are fully described and claimed in my companion application for patent thereon, filed July 27, 1916, Serial No. 111,639.

The front axle 8 extends transversely between the frame side-bars 1 near the front ends thereof, the ends of said axle being fixedly secured to said side-bars. At each side of the frame there is a diagonal brace-bar 9 having one end secured to the side-bar behind the axle, and the other secured to a lug 10 on the axle intermediate the center and end thereof. Around the central part of the axle there is disposed an annular race 11 which is pivotally connected with the axle by a vertically-extending king-pin 12, the same extending through suitable openings therefor in the race and axle. A coil spring 13 is disposed around the king-pin between the lower side of the axle and the adjacent portion of the race. Said spring is normally under compression such that it will sustain the axle and hold the same up against the upper side of the transverse opening through the race, but it may yield under abnormal loads and permit a slight downward movement of the axle relatively to the race. The hub 14 of the steering-wheel is revolubly mounted on the race, being held concentric therewith by a series of bearing-rollers 15 arranged between them, as shown. The said rollers 15 are spool-shaped, being axially-perforate and having integral flanges at the ends thereof which fit into corresponding channels in the adjacent faces of the race and hub. The rollers are held in spaced relation to each other by means of bolts 16 and cage-rings 17, said bolts passing transversely through the cage-rings and rollers, and the latter fitting revolubly on the central portions of the bolts. The cage-rings 17 have flanges 18 extending inwardly from the edges thereof over the adjacent annular end-portions of the race and hub, and fitting slidably upon said portions so as to exclude dirt and the like from the bearing. The wheel-hub has a central outwardly-extending flange 19 to which the spokes 20 are secured by rivets 21. The spokes extend divergently from each other in planes parallel with the wheel-axis, being arranged on opposite sides alternately, as shown clearly in Fig. 2. The outer ends of the spokes are secured to the inner side of the wheel-rim 22, and the latter is provided at the sides with inwardly-extending flanges, as shown.

On the inner portion of the race 11 at a point in front of the king-pin 12 there is a pair of lugs 23 between which the end of a connecting-bar 24 is pivotally secured. Said bar 24 extends out laterally and the outer end thereof is pivotally connected with the forwardly-extending arm of an L-shaped lever 25. Said lever is fulcrumed on a pin 26 held in a lug 27 on the axle 8, said pin 26 being inclined slightly forward from a vertical position. To the forked outer end of the laterally-extending arm of the lever 25 a block 28 is pivotally connected by means of a pin 29, so as to be swingable in a plane perpendicular to the axis of the pin 26. The block 28 has a threaded longitudinal opening through it, and at the outer side thereof are two lugs 30 separated by a kerf which extends in to the longitudinal opening. Said lugs 30 are connected with each other by bolts 31, by which they may be drawn toward each other to slightly contract the longitudinal threaded opening of the block. In said threaded opening there is screwed the threaded lower and forward end-portion 32 of the steering-shaft 33. Wear of the threads may be compensated by tightening down the bolts 31. From the portion 32 the shaft 33 extends diagonally rearward and upward, and near its upper and rearward end is journaled in a bearing 34, with which it is held in fixed longitudinal relation by collars 35 secured on the shaft at each side of the bearing. The bearing is carried on a transversely extending arch-beam 36 of which the lower portion is secured to the main frame of the machine. At the end of the steering-shaft the hand-wheel 37 is secured thereon, said hand-wheel being thus positioned conveniently for the driver when sitting upon the seat 38 which is arranged as shown in Fig. 1.

By turning the hand-wheel and shaft 33 the block 28 is moved longitudinally of the threaded shaft-portion 32, the lever 25 is moved pivotally about the pin 26, and the connecting-bar 24 is moved laterally to turn the race 11 about the vertical axis of the king-pin 12, so that the steering-wheel is thus turned to an angular relation with the main frame, as shown by dotted lines in Fig. 2. The race and steering-wheel are held in fixed axial relations by the spool-shaped rollers and also by the cage-rings 17.

From the foregoing it will be apparent that my invention provides a strong and simple steering mechanism and frame for tractors, wherein a large steering-wheel may be employed without offsetting the frame from a horizontal plane, or offsetting laterally the longitudinal frame-members. The forward push of the driving-wheels being transmitted in a direct horizontal line to the center of the steering-wheel, has no tendency to cause torsional stresses in the frame. The large steering-wheel has, of course, the advantage of moving easily over rough ground, and as its lateral movements are made about a vertical axis so that its plane of rotation is never inclined to the surface of the ground, the wheel has no tendency to plow or run into the ground when turning. The arrangement of the wheels and frame is such as to permit a low center of gravity of the machine as a whole, so that it will have great stability on sloping ground and when turning corners, and the disposal of the single steering-wheel at the transverse center of the frame permits the lines of the frame to be kept symmetrical and the stresses therein equalized as between the two sides thereof.

Now, having described my invention, what I claim and desire to secure by Letters Patent is:

1. In a machine of the class described, a horizontal frame having parallel side-members and an integral rigid end-member providing a central draft connection to the frame, a transverse axle spaced from said end-member and rigidly secured to the parallel side-members, an annular member encircling the intermediate part of said axle and swingably connected therewith upon a vertical axis, a laterally movable part connected with said annular member for swinging the same about said vertical axis, and a wheel journaled upon said annular member and swingable laterally therewith in the space between the side-members of the frame and adjoining the end-member of the frame.

2. In a machine of the class described, a frame having a fixed transverse axle, an annular race encircling the intermediate portion of said axle and pivotally connected therewith so as to be swingable about a vertical axis, a wheel encircling said annular race and journaled thereon, an inclined steering-shaft journaled at one end in the frame, a lever pivoted to move in a plane parallel with the axis of said shaft, a block screw-connected with said shaft and pivotally connected with a part of said lever, and a bar connecting a part of said lever and the annular race, whereby rotation of the steering-shaft moves the block longitudinally thereof and actuates said lever to turn the race and wheel about their vertical axis.

LEE C. SHARP.

Copies of this patent may be obtained for five cents each, by addressing the "Commissioner of Patents, Washington, D. C."